US011025462B2

(12) United States Patent
Copps

(10) Patent No.: US 11,025,462 B2
(45) Date of Patent: *Jun. 1, 2021

(54) SYSTEMS AND METHODS FOR MODIFYING MODULATED SIGNALS FOR TRANSMISSION

(71) Applicant: Rovi Guides, Inc., San Jose, CA (US)

(72) Inventor: Jeffry Copps, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,408

(22) Filed: Jan. 30, 2020

(65) Prior Publication Data
US 2020/0344095 A1   Oct. 29, 2020

Related U.S. Application Data

(63) Continuation of application No. 16/383,107, filed on Apr. 12, 2019, now Pat. No. 10,587,439.

(51) Int. Cl.
*H04L 27/00* (2006.01)
*H04L 27/12* (2006.01)

(52) U.S. Cl.
CPC .................. *H04L 27/122* (2013.01)

(58) Field of Classification Search
CPC . H04L 1/0003; H04L 1/0071; G01L 21/0308; G01L 19/025
USPC ............................................ 375/295; 381/92
See application file for complete search history.

(56) References Cited

U.S. PATENT DOCUMENTS

| 10,491,994 | B2* | 11/2019 | Slotte ....................... H04R 3/04 |
| 2013/0138434 | A1* | 5/2013 | Furuta ..................... G10L 21/02 |
| | | | 704/226 |
| 2014/0241549 | A1* | 8/2014 | Stachurski ............ H04M 3/568 |
| | | | 381/92 |

FOREIGN PATENT DOCUMENTS

JP          04 207236          7/1992

OTHER PUBLICATIONS

International Search Report and Written Opinion in PCT/US2020/027791 dated Jul. 27, 2020.
Les Atlas, "Modulation Spectral Filtering of Speech", Eurospeech 2003—Geneva, Sep. 1, 2003, pp. 2577-2580.
Qian, J. et al., "VoiceMask: Anonymize and Sanitize Voice Input on Mobile Devices", Arxiv Org., Cornell University Library, Ithaca, NY, Nov. 30, 2017, pp. 1-10.

* cited by examiner

*Primary Examiner* — Khai Tran
(74) *Attorney, Agent, or Firm* — Haley Guiliano LLP

(57) ABSTRACT

Systems and methods are disclosed herein for modifying modulated signals for transmission. The system receives a modulated signal comprising a speech signal and a carrier wave and generates first and second spectral signals by converting the modulation signal and carrier wave from the time domain to the frequency domain respectively. The system then determines spectral bands for the first and second spectral signals. For each spectral band, the system calculates a weighted spectral band value based on a magnitude of the first spectral signal within the spectral band and generates a modified spectral signal by modifying the second spectral signal with the weighted spectral band value. The system then converts the modified spectral signal from the frequency domain to the time domain and transmits the converted modified spectral signal to a server.

20 Claims, 8 Drawing Sheets

200

300

400

SYSTEMS AND METHODS FOR MODIFYING MODULATED SIGNALS FOR TRANSMISSION

CROSS-REFERENCE TO RELATED APPLICATION

This application is a continuation of U.S. patent application Ser. No. 16/383,107, filed Apr. 12, 2019. The contents of which are hereby incorporated by reference herein in its entirety.

BACKGROUND

The present disclosure is directed to techniques for signal modulation, more particularly, modifying modulation signals to avoid feature extraction from digital speech data.

SUMMARY

Conventional signal processing approaches for modifying digital speech data by modulation require substantial processing resources and/or time expenditure. These conventional signal processing techniques, such as wavelet techniques, may be used to modify digital speech data using a convolution procedure requiring shifting signal phase, multiplication of signal portions, and integration of the signal portions. Each of these stages requires significant processing resources to complete. Techniques for modulating digital speech data to avoid feature extraction (e.g., anonymizing gender, pitch, and cadence) remain technically challenging, as conventional signal processing approaches cannot efficiently process the digital speech data to prevent feature extraction.

Accordingly, techniques are disclosed herein for modifying modulated signals for transmission. The disclosed techniques herein discuss receiving a modulated signal including a speech signal and a carrier wave. First and second spectral signals are generated by converting the speech signal and carrier wave from the time domain to the frequency domain (e.g., using fast Fourier Transform). Spectral bands for the first and second spectral signals are determined. For each spectral band, a weighted spectral band value is calculated based on the magnitude of the first spectral signal within the spectral band. The disclosed techniques generate, for each spectral band, a modified spectral signal by modifying the second spectral signal with the weighted spectral band value. The modified spectral signal is converted from the frequency domain to the time domain and then transmitted to a server.

In some embodiments disclosed herein, the disclosed techniques execute weighting operations to the magnitudes for each of the frequencies within the spectral band. Specifically, the system determines a plurality of frequencies within the spectral band. Magnitudes are then calculated for each of the plurality of frequencies within the spectral band. The system executes a weighting operation (e.g., a weighted average) of the magnitudes for each of the plurality of frequencies within the spectral band.

In some variants, the system determines spectral bands for the first and second spectral signals by determining spectral bands based on predefined values. The system then assigns the determined spectral bands to the first and second spectral signals such that both spectral signals have the same spectral bands.

The techniques disclosed herein may be used as means to efficiently anonymize speech signals. Recognizable features of speech signals including gender, cadence, expression, inflections, and other audio cues associated with speech may be anonymized for further processing. For example, further processing may include speech-to-text extraction. In this scenario, the modified spectral signal sent to a speech-to-text extraction server results in the server processing an anonymized speech signal with no features for extraction.

BRIEF DESCRIPTION OF THE DRAWINGS

The below and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
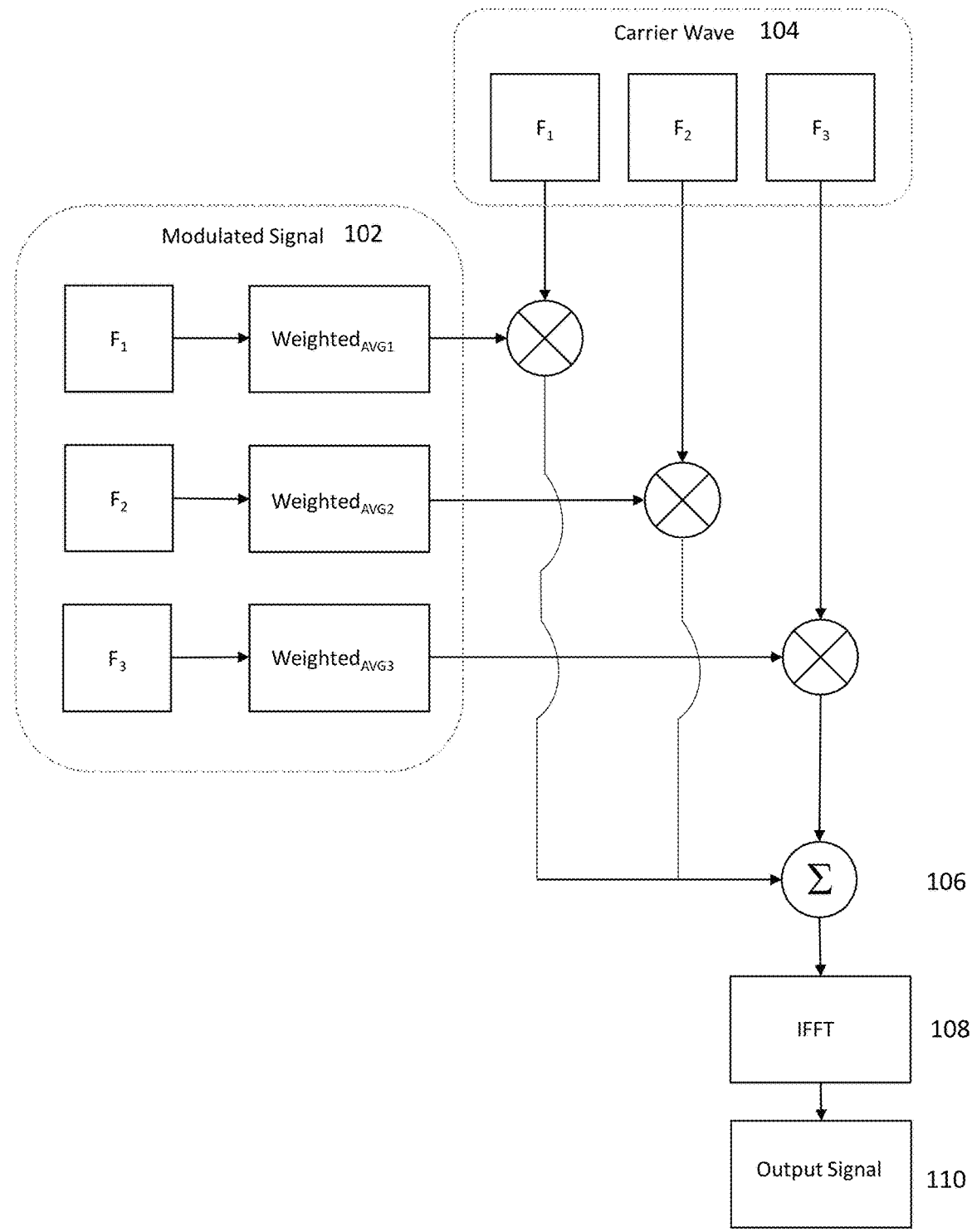
FIG. 1 shows an illustrative diagram for modifying modulated signals for transmission, in accordance with some embodiments of the disclosure.

FIG. 1 shows an illustrative diagram 100 for modifying modulated signals for transmission, in accordance with some embodiments of the disclosure. A modification engine receives a modulated signal 102 including both a speech signal and a carrier wave. The speech signal may be any type of digital speech data including all elements of speech, including lexical and non-lexical speech elements. The carrier wave may be any type of carrier wave including sinusoidal, sawtooth, or another type of carrier wave. In a preferred embodiment, a sawtooth carrier wave is used as the carrier wave due to inherent harmonic richness, which is adaptable for carrying a speech signal. The received modulated signal is derived from the signal processing modulation of the input speech signal and the carrier wave. In some embodiments, the modulation is performed at the modification engine. In yet other embodiments, the modulation is performed on a device prior to the modification engine receiving the modulated signal (e.g., on a device receiving speech input such as a smartphone/smartwatch, or a server that receives the speech input from a first device and modulates the speech signal before transmitting the modulated signal to the modification engine).

The modification engine generates a first spectral signal by converting the modulation signal from the time domain to the frequency domain and then determines the spectral bands for the first spectral signal. As shown in FIG. 1, there are three filters $F_1$-$F_3$ applied to the modulated signal to define three spectral bands. Filters are selected based on spectral band selection. For each spectral band a weighted spectral band value is calculated based on the magnitude of the first spectral signal within the spectral band. For example, the modification engine calculates a weighted average of the magnitudes of the amplitudes of the frequencies within the first spectral band, and subsequently for the other second and third spectral bands.

A modified spectral signal is generated by the modification engine, for each spectral band, by modifying the second spectral signal (e.g., the carrier wave 104) with the same filters used for the modulated signal to select the same spectral bands from the carrier wave $F_1$-$F_3$. Both these inputs are modified through modulation to generate respective modified spectral signals for each band. The modification engine performs a summation operation 106 for each of these modified spectral signals.

The modification engine then converts the summation of the modified spectral signals from the frequency domain to the time domain. This may be performed using various conversion techniques such as inverse fast Fourier Transform (IFFT) 108. The modification engine then transmits the converted modified spectral signal to a server 110.

Figure 2:
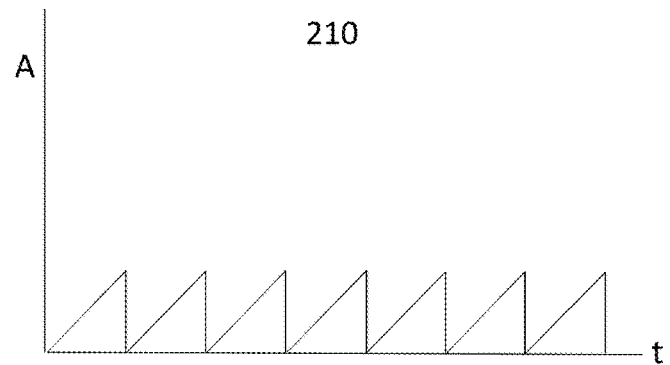
FIG. 2 shows an illustrative diagram of a sawtooth wave in the time domain and transformed into the frequency domain, in accordance with some embodiments of the disclosure.
Figure 2:
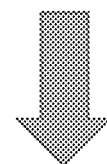
Figure 2:
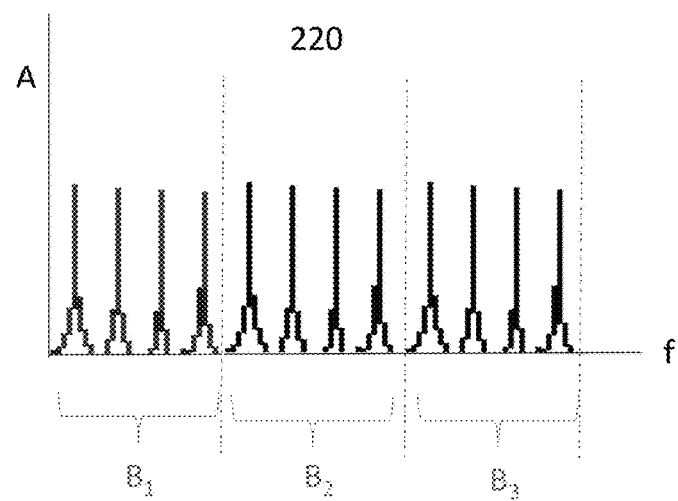

FIG. 2 shows an illustrative diagram 200 of a sawtooth wave in the time domain and transformed into the frequency domain, in accordance with some embodiments of the disclosure. Graph 210 illustrates a time domain representation of a sawtooth carrier wave showing equal peaks of amplitudes appearing periodically. Graph 220 illustrates a frequency domain representation of the sawtooth carrier wave showing equal peaks of amplitudes appearing periodically across the measured spectral bands $B_1$-$B_3$.

Figure 3:
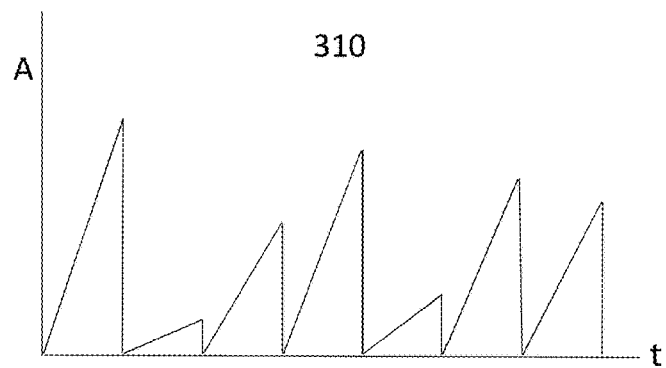
FIG. 3 shows an illustrative diagram of a modulated speech signal in the time domain and transformed into the frequency domain, in accordance with some embodiments of the disclosure.
Figure 3:
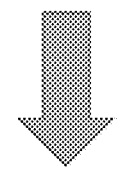
Figure 3:
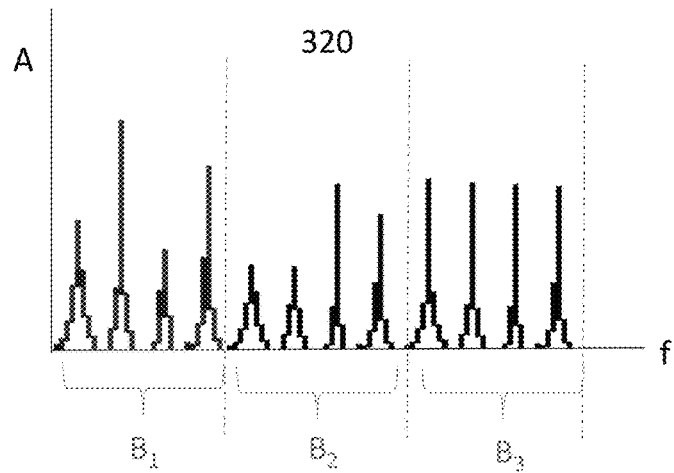

FIG. 3 shows an illustrative diagram 300 of a modulated speech signal in the time domain and transformed into the frequency domain, in accordance with some embodiments of the disclosure. Graph 310 illustrates a time domain representation of a received modulated signal (including speech signal). As illustrated, the amplitudes are irregular when analyzed periodically, likely due to speech being irregular in tone and volume. Graph 320 illustrates a frequency domain representation of the modulated signal showing unequal peaks of amplitudes appearing periodically across the measured spectral bands $B_1$-$B_3$.

Figure 4:
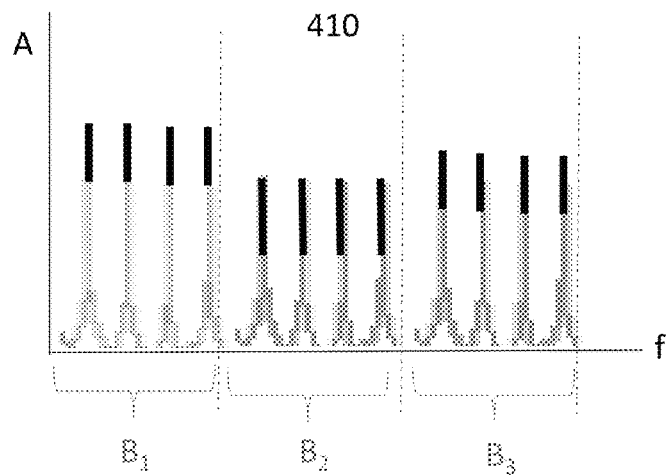
FIG. 4 shows an illustrative diagram of a converted modified spectral signal in the frequency domain and transformed into the time domain, in accordance with some embodiments of the disclosure.
Figure 4:
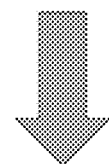
Figure 4:
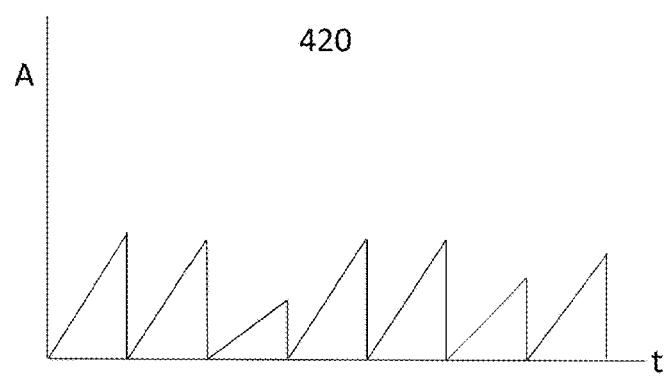

FIG. 4 shows an illustrative diagram 400 of a converted modified spectral signal in the frequency domain and transformed into the time domain, in accordance with some embodiments of the disclosure. Graph 410 illustrates a frequency domain representation of the sawtooth wave (i.e., second spectral signal) modified with the weighted spectral band value. Each spectral band may have a separate weighted spectral band value. Thus, band $B_1$ is modified to increase the amplitude of the second spectral signal, while band $B_2$ is modified to reduce the amplitude of the second spectral signal. Band $B_3$ is modified to increase the amplitude of the second spectral signal, however the magnitude of increase is less than the increase of band $B_1$. Graph 420 illustrates a time domain representation of the modified spectral signal (including all converted bands $B_1$-$B_3$).

Figure 5:
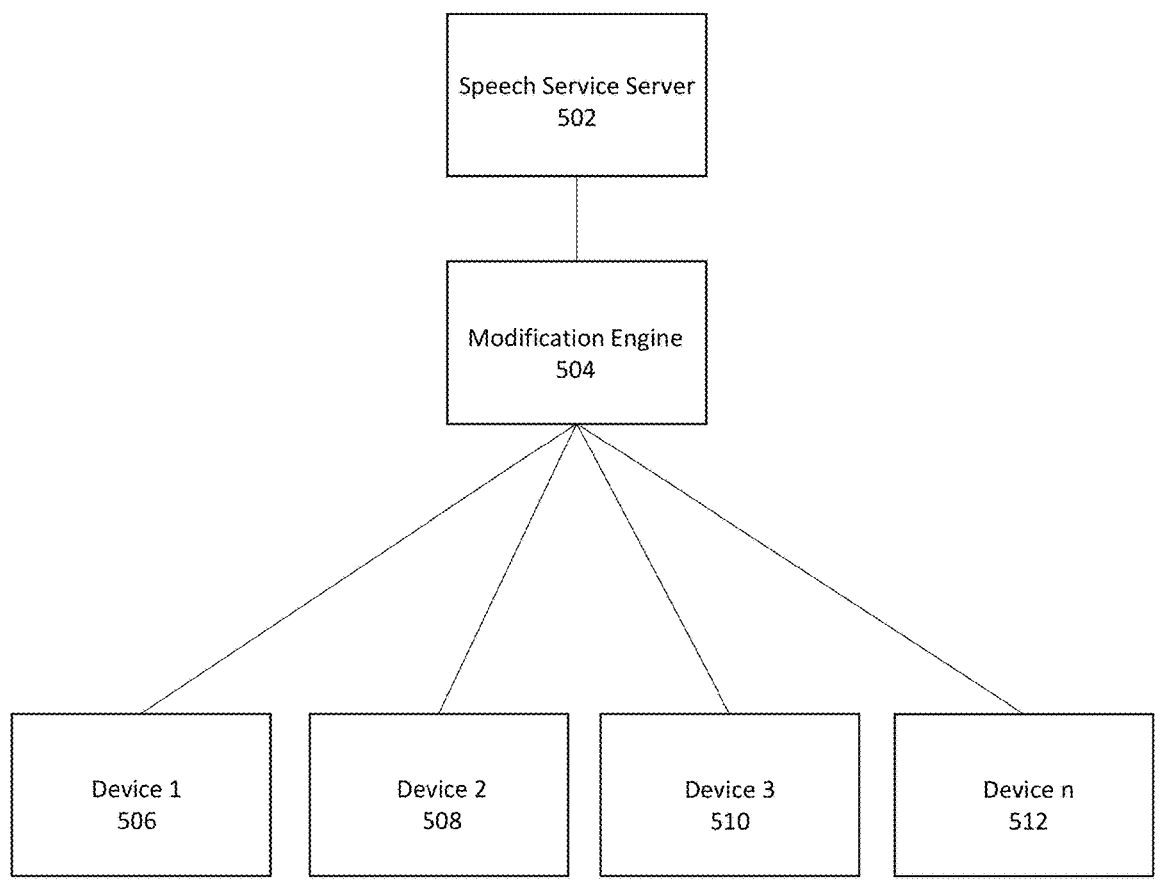
FIG. 5 shows an illustrative system diagram of the modification engine, speech service server, and multiple electronic devices, in accordance with some embodiments of the disclosure.
Figure 6:
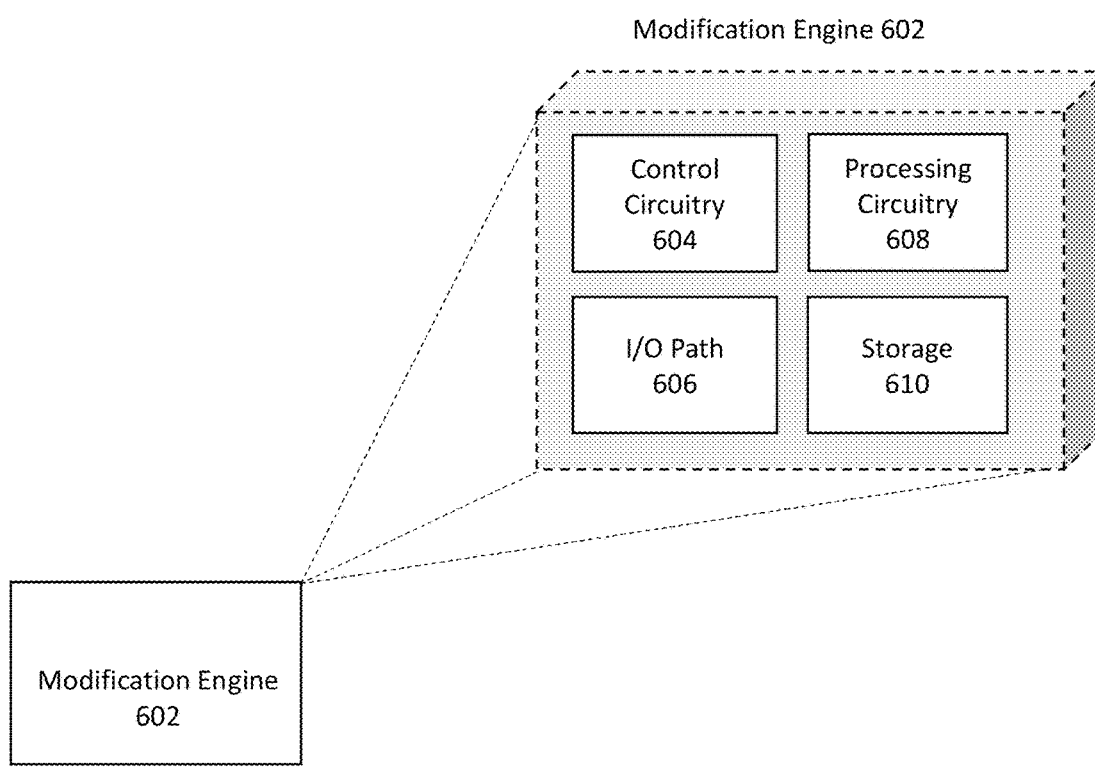
FIG. 6 shows an illustrative block diagram of the modification engine, in accordance with some embodiments of the disclosure.

FIG. 5 shows an illustrative system diagram 500 of the modification engine, speech service server, and multiple electronic devices, in accordance with some embodiments of the disclosure. The modification engine 504 may be of any hardware that provides for signal processing and transmit/receive functionality for signals. The modification engine may be communicatively coupled to multiple electronic devices (e.g., device 1 (506), device 2 (508), device 3 (510), device n (512)). The modification engine may be communicatively coupled to a speech service server 502. As illustrated within FIG. 5, the modification engine 504 serves as a middleware between the electronic devices 506-512 and the speech service server 502. A further detailed disclosure on the modification engine can be seen in FIG. 6 showing an illustrative block diagram of the modification engine, in accordance with some embodiments of the disclosure.

In some embodiments, the modification engine may be implemented remote from the electronic devices 506-512 such as a cloud server configuration. In yet other embodiments, the modification engine may be integrated into electronic devices 506-512. In other variants, the modification engine may be integrated into the speech service server 502. Any of the system modules (e.g., modification engine, speech service server, electronic devices) may be any combination of shared or disparate hardware pieces that are communicatively coupled.

The electronic devices (e.g., device 1 (506), device 2 (508), device 3 (510), device n (512)) may be any device that has properties to transmit speech signals. In other embodiments, the electronic devices may also have capabilities to transmit modulated signals including speech signals and a carrier wave. The transmission may be analog or digital (including digital speech data). For example, the electronic device may be any processor-based system, state machine, or retrofit network-connected device. In various systems, devices can include, but are not limited to, network-connected devices (e.g., Internet-of-Things devices), smartphones, personal computers, smart appliances, consumer electronics, industrial equipment, security systems, digital twin systems, and similar systems or any combination of these systems.

The speech service server 502 may be any database, server, or computing device that contains memory for receiving signals containing speech signals. The received signals may be unmodified or modified by a modification engine. In some variants, the speech service server may be a server providing services based on received speech signals (e.g., Amazon Alexa server, Apple HomePod server, Microsoft Cortana server, Google Assistant server, virtual assistant servers, speech-to-text server, and/or other voice command servers).

FIG. 6 shows an illustrative block diagram 600 of the modification engine, in accordance with some embodiments of the disclosure. In some embodiments, the modification engine may be communicatively connected to a user interface. In some embodiments, the modification engine may include processing circuitry, control circuitry, and storage (e.g., RAM, ROM, hard disk, removable disk, etc.). The modification engine may include an input/output path 606. I/O path 606 may provide device information, or other data, over a local area network (LAN) or wide area network (WAN), and/or other content and data to control circuitry 604, which includes processing circuitry 608 and storage 610. Control circuitry 604 may be used to send and receive commands, requests, signals (digital and analog), and other suitable data using I/O path 606. I/O path 606 may connect control circuitry 604 (and specifically processing circuitry 608) to one or more communications paths.

Control circuitry 604 may be based on any suitable processing circuitry such as processing circuitry 608. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for a modification engine stored in memory (e.g., storage 610). In some embodiments, the processing circuitry provides for digital signal processing (DSP) processors by integrating specific hardware (e.g., Texas Instruments C6000 series DSPs, Freescale DSPs, Analog Devices SHARC-based DSPs, and Huarui-2 processors by Nanjing Research Institute of Electronics Technology). The DSP processors may be dedicated integrated circuit chips.

Memory may be an electronic storage device provided as storage 610, which is part of control circuitry 604. As referred to herein, the phrase "electronic storage device" or "storage device" should be understood to mean any device for storing electronic data, computer software, or firmware, such as random-access memory, read-only memory, hard drives, solid state devices, quantum storage devices, or any other suitable fixed or removable storage devices, and/or any combination of the same. Nonvolatile memory may also be used (e.g., to launch a boot-up routine and other instructions). In some embodiments, the memory for DSP may include Harvard architecture or Modified von Neumann architecture.

The modification engine 602 may be coupled to a communications network. The communication network may be one or more networks including the Internet, a mobile phone network, mobile voice or data network (e.g., a 5G, 4G or LTE network), mesh network, peer-2-peer network, cable network, or other types of communications network or combinations of communications networks. Paths may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths.

Figure 7:
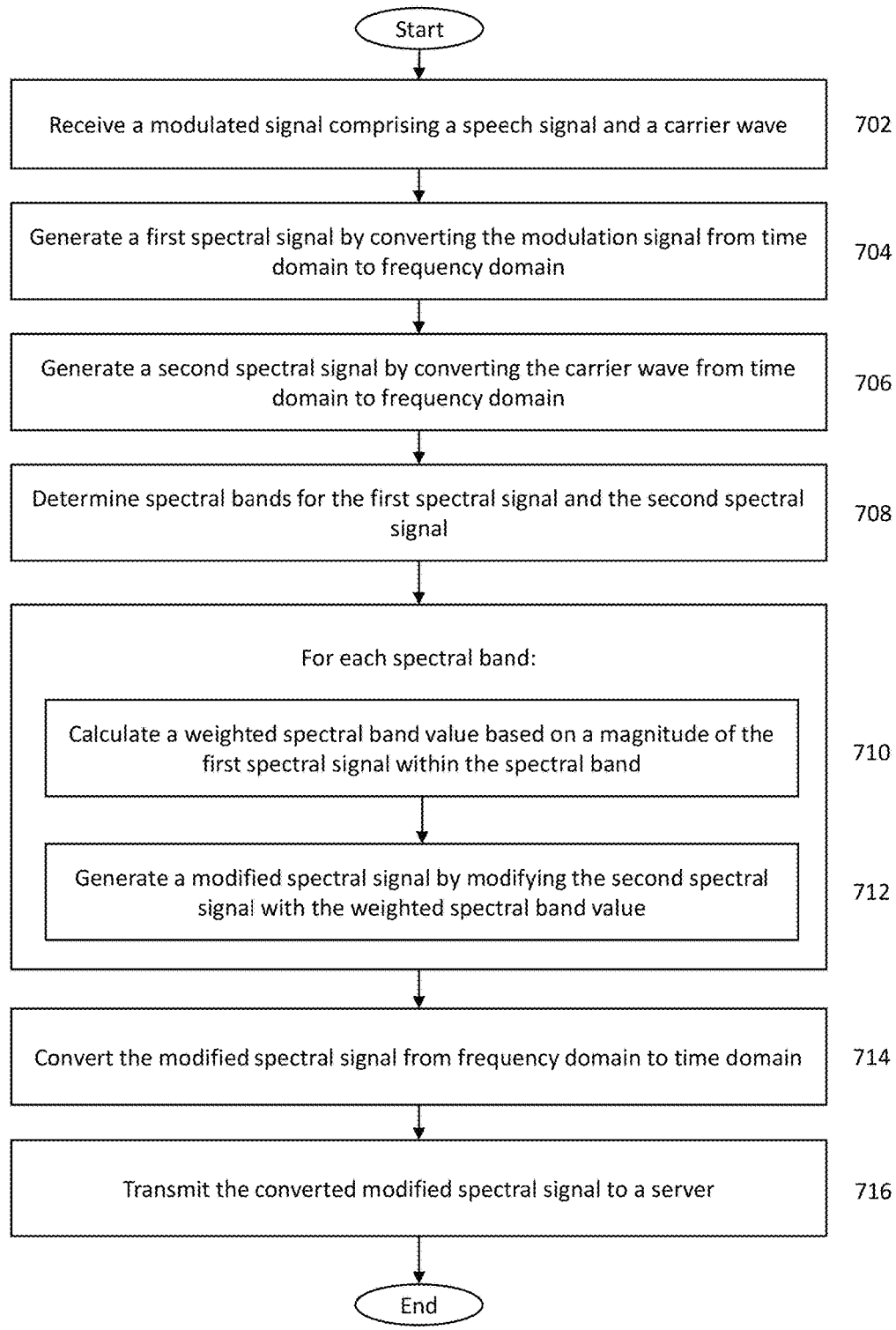
FIG. 7 is an illustrative flowchart of a process for selective audio segment compression for accelerated playback of media assets, in accordance with some embodiments of the disclosure.

FIG. 7 is an illustrative flowchart of a process for selective audio segment compression for accelerated playback of media assets, in accordance with some embodiments of the disclosure. Process 700, and any of the following processes, may be executed by control circuitry 604 (e.g., in a manner instructed to control circuitry 604 by the modification engine). Control circuitry 604 may be part of modification engine 602, or of a remote server separated from the modification engine by way of a communication network, or distributed over a combination of both.

At 702, the modification engine 602, by control circuitry 604, receives a modulated signal comprising a speech signal and a carrier wave. In some embodiments, the modification engine receives the modulated signal through the I/O path 606 which is coupled to an electronic device 506-512. In some embodiments, the modification engine, by control circuitry 604, selects a carrier wave. The carrier wave may be a sawtooth wave, sinusoidal wave, or any other type of wave. In yet other embodiments, the modification engine is assigned a carrier wave through the I/O path 606.

At 704, the modification engine 602, by control circuitry 604, generates a first spectral signal by converting the modulation signal from the time domain to the frequency domain. In some embodiments, the modification engine uses processing circuity 608 to convert the modulation signal from the time domain to the frequency domain (e.g., applying techniques such as fast Fourier Transform).

At 706, the modification engine 602, by control circuitry 604, generates a second spectral signal by converting the carrier wave from the time domain to the frequency domain. In some embodiments, the modification engine uses processing circuity 608 to convert the modulation signal from the time domain to the frequency domain (e.g., applying techniques such as Fourier Transform).

At 708, the modification engine 602, by control circuitry 604, determines spectral bands for the first spectral signal and the second spectral signal. In some embodiments, the modification engine utilizes processing circuity 608 to determine the spectral bands. In some embodiments, the modification engine retrieves predefined values from a database through the I/O path 606. The database may be integrated in the modification engine, a third-party server, integrated into devices 506-512, or any other data structure that stores predefined values for determining spectral bands. The modification engine 602, by control circuitry 604, determines spectral bands for the first spectral signal and the second spectral signal based on predefined values. The modification engine, by control circuitry 604, then assigns the determined spectral bands to the first spectral signal and the second spectral signal. The assignment of the spectral bands is stored in storage 610. In some embodiments, when determining spectral bands for the first spectral signal and the second spectral signal, the modification engine 602, by control circuitry 604, selects one or more filters to create the determined spectral bands. In some embodiments, the selection of the filters is performed at least in part by processing circuitry 608. In some embodiments, the selection of the filters is provided to the modification engine through the I/O path 606. The modification engine 602, by control circuitry 604, modifies the first spectral signal and the second spectral signal based on the selected one or more filters to create the determined spectral bands. In some embodiments, the modification of the first and second spectral signals is performed at least in part by processing circuitry 608. In some embodiments, the one or more filters comprise at least one of a low pass filter, band pass filter, and high pass filter.

Figure 8:
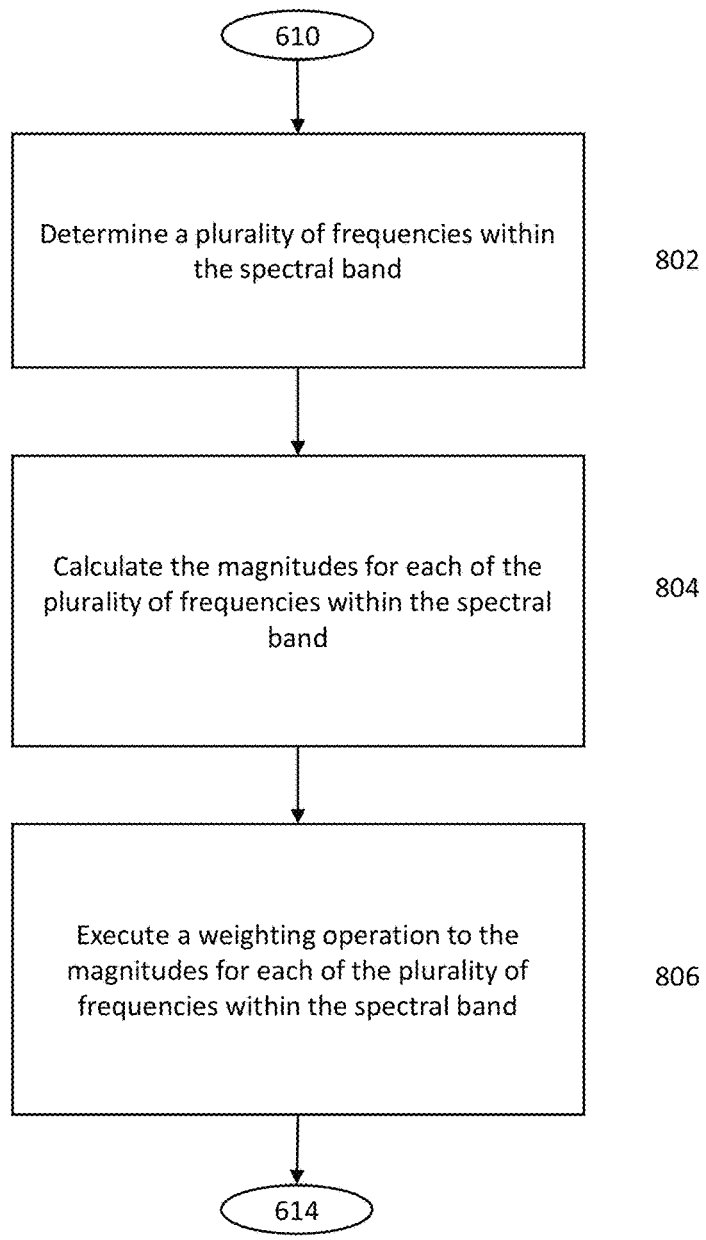
FIG. 8 is an illustrative flowchart of a process for executing a weighting operation to the magnitudes for each of the plurality of frequencies within the spectral band, in accordance with some embodiments of the disclosure.

At 710, the modification engine 602, by control circuitry 604, for each spectral band, calculates a weighted spectral band value based on a magnitude of the first spectral signal within the spectral band for each spectral band. In some embodiments, the calculation of the weighted spectral band value is performed at least in part by the processing circuitry 608. A further detailed disclosure on calculation of a weighted spectral band value based on a magnitude of the first spectral signal within the spectral band for each spectral band can be seen in FIG. 8 showing an illustrative flowchart of a process for executing a weighting operation to the magnitudes for each of the plurality of frequencies within the spectral band, in accordance with some embodiments of the disclosure.

At 712, the modification engine 602, by control circuitry 604, for each band, generates a modified spectral signal by modifying the second spectral signal with the weighted spectral band value. In some embodiments, the modifying the second spectral signal with the weighted spectral band value is performed by the processing circuitry 608. In some embodiments, the modification engine 602, by control circuitry 604, modifies the second spectral signal by amplitude modulation, frequency modulation, or phase modulation.

At 714, the modification engine 602, by control circuitry 604, converts the modified spectral signal from the frequency domain to the time domain. In some embodiments, the conversion of the modified spectral signal from the frequency domain to the time domain performed by the processing circuitry 608. In some embodiments, the conversion technique used is inverse fast Fourier Transform.

At 716, the modification engine 602, by control circuitry 604, transmits the converted modified spectral signal to a server. In some embodiments, the modification server utilizes the I/O path 606 to transmit the converted modified spectral signal to the server (e.g., speech service server 502).

FIG. 8 is an illustrative flowchart of a process 800 for executing a weighting operation to the magnitudes for each of the plurality of frequencies within the spectral band, in accordance with some embodiments of the disclosure. At 802, the modification engine 602, by control circuitry 604, determines a plurality of frequencies within the spectral band. In some embodiments, the modification engine determines a plurality of frequencies within the spectral band using processing circuitry 608.

At 804, the modification engine 602, by control circuitry 604, calculates the magnitudes for each of the plurality of frequencies within the spectral band. In some embodiments, the modification engine calculates the magnitudes for each of the plurality of frequencies within the spectral band using processing circuitry 608. For example, the processing circuitry 608 may have specific DSP processors to efficiently calculating the magnitudes for each of the plurality of frequencies.

At 806, the modification engine 602, by control circuitry 604, executes a weighting operation to the magnitudes for each of the plurality of frequencies within the spectral band. In some embodiments, the modification engine executes the weighting operation using processing circuitry 608. For example, the processing circuitry 608 may have specific DSP processors to efficiently perform the weighting operations. In some embodiments, the weighting operations include at least one of a weighted average, mean calculation, standard deviation, median determination, mode determination, arithmetic operations, and statistical operations.

It is contemplated that the steps or descriptions of FIGS. 7-8 may be used with any other embodiment of this disclosure. In addition, the steps and descriptions described in relation to FIGS. 7-8 may be done in alternative orders or in parallel to further the purposes of this disclosure. For example, each of these steps may be performed in any order or in parallel or substantially simultaneously to reduce lag or increase the speed of the system or method. Any of these steps may also be skipped or omitted from the process. Furthermore, it should be noted that any of the devices or equipment discussed in relation to FIGS. 5-6 could be used to perform one or more of the steps in FIGS. 7-8.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for modifying a speech signal for transmission comprising:
   receiving the speech signal;
   converting the speech signal from the time domain to the frequency domain;
   determining spectral bands for the speech signal and a spectral signal;
   for each spectral band, generating a modified spectral signal by modifying the spectral signal based on a magnitude of the speech signal;
   converting the modified spectral signal from the frequency domain to the time domain; and
   causing to transmit the converted modified spectral signal to a server.

2. The method of claim 1, wherein modifying the spectral signal based on a magnitude of the speech signal comprises:
   calculating a weighted spectral band value based on the magnitude of the speech signal;
   determining a plurality of frequencies within each spectral band;
   calculating the magnitudes for each of the plurality of frequencies within each spectral band; and
   executing a weighting operation to the magnitudes for each of the plurality of frequencies within each spectral band.

3. The method of claim 2, wherein the weighting operation comprises at least one of a weighted average, mean calculation, standard deviation, median determination, mode determination, arithmetic operations, and statistical operations.

4. The method of claim 1, wherein the modification of the spectral signal comprises at least one of amplitude modulation, frequency modulation, and phase modulation.

5. The method of claim 1, wherein modification of the spectral signal comprises:
   determining the spectral bands for the speech signal based on predefined values; and
   assigning the determined spectral bands to the speech signal.

6. The method of claim 5, further comprising:
   selecting one or more filters to create the determined spectral bands; and
   modifying the speech signal based on the selected one or more filters to create the determined spectral bands.

7. The method of claim 6, wherein the one or more filters comprise at least one of a low pass filter, band pass filter, and high pass filter.

8. The method of claim 1, wherein the speech signal is generated by converting a modulation signal from the time domain to the frequency domain comprises a fast Fourier Transform.

9. The method of claim 1, wherein converting the modified spectral signal from the frequency domain to the time domain comprises an inverse fast Fourier Transform.

10. The method of claim 1, wherein generating a modified spectral signal by modifying the spectral signal based on a magnitude of the speech signal comprises modulating the spectral signal with a sawtooth wave.

11. A system for modifying a speech signal for transmission comprising:
control circuitry configured to:
receive the speech signal;
convert the speech signal from the time domain to the frequency domain;
determine spectral bands for the speech signal and a spectral signal;
for each spectral band, generating a modified spectral signal by modifying the spectral signal based on a magnitude of the speech signal;
convert the modified spectral signal from the frequency domain to the time domain; and
cause to transmit the converted modified spectral signal to a server.

12. The system of claim 11, wherein the control circuitry is configured, when modifying the spectral signal based on a magnitude of the speech signal, to:
calculate a weighted spectral band value based on the magnitude of the speech signal;
determine a plurality of frequencies within each spectral band;
calculate the magnitudes for each of the plurality of frequencies within each spectral band; and
execute a weighting operation to the magnitudes for each of the plurality of frequencies within each spectral band.

13. The system of claim 12, wherein the weighting operation comprises at least one of a weighted average, mean calculation, standard deviation, median determination, mode determination, arithmetic operations, and statistical operations.

14. The system of claim 11, wherein the modification of the spectral signal comprises at least one of amplitude modulation, frequency modulation, and phase modulation.

15. The system of claim 11, wherein the control circuitry is configured, when modifying the spectral signal, to:
determine the spectral bands for the speech signal based on predefined values; and
assign the determined spectral bands to the speech signal.

16. The system of claim 15, wherein the control circuitry is further configured to:
select one or more filters to create the determined spectral bands; and
modifying the speech signal based on the selected one or more filters to create the determined spectral bands.

17. The system of claim 16, wherein the one or more filters comprise at least one of a low pass filter, band pass filter, and high pass filter.

18. The system of claim 11, wherein the speech signal is generated by converting a modulation signal from the time domain to the frequency domain comprises a fast Fourier Transform.

19. The system of claim 11, wherein converting the modified spectral signal from the frequency domain to the time domain comprises an inverse fast Fourier Transform.

20. The system of claim 11, wherein generating a modified spectral signal by modifying the spectral signal based on a magnitude of the speech signal comprises modulating the spectral signal with a sawtooth wave.

* * * * *